Dec. 14, 1926.                                             1,610,452
J. E. KENNEDY
PNEUMATIC TIRE SAFETY SIGNAL
Filed July 22, 1925
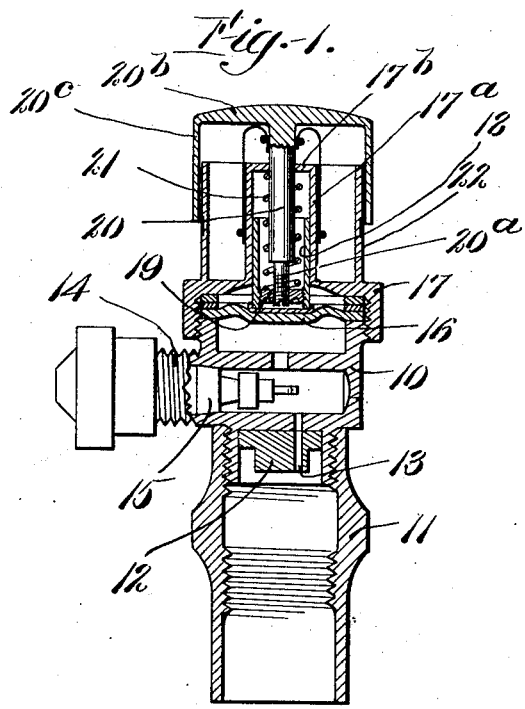
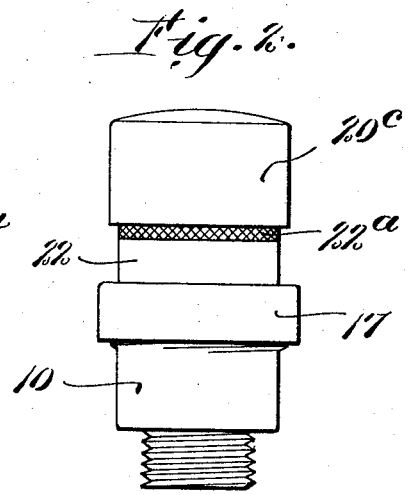
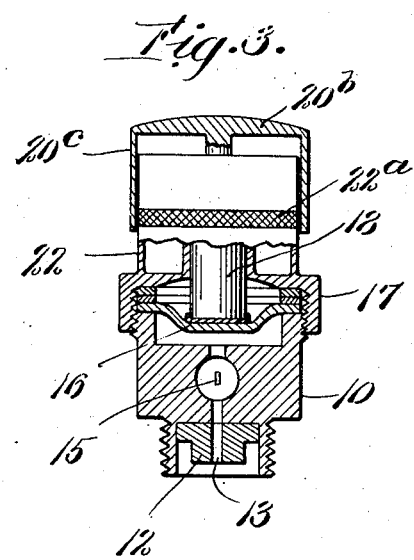
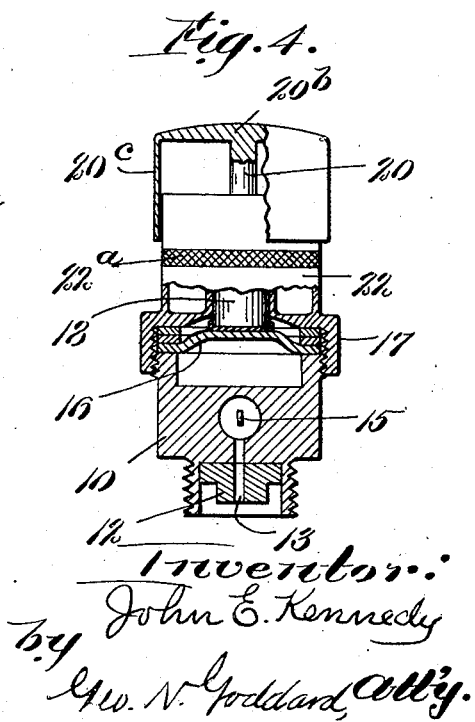
Inventor:
John E. Kennedy
by Geo. N. Goddard, Atty.

Patented Dec. 14, 1926.

1,610,452

UNITED STATES PATENT OFFICE.

JOHN E. KENNEDY, OF LOS ANGELES, CALIFORNIA.

PNEUMATIC-TIRE SAFETY SIGNAL.

Application filed July 22, 1925. Serial No. 45,261.

This invention relates to pneumatic tire safety signals, and is intended to provide a simple, durable and reliable device of this kind adapted to be permanently secured to the tire and have continuous communication with the interior thereof so as to give indication of over-inflation or under-inflation of the tire of such marked visibility as to make the signal visually effective at a distance without close inspection or reading of a finely marked scale.

The present improvement is a modification or alternative construction to that shown in my co-pending application for U. S. patent filed June 24, 1922 bearing Serial No. 570,661, and embodies a different form of the same principle underlying the device forming the subject matter of said application.

Since the great majority of motorists will not take the trouble to remove the dust caps of each tire and apply a pressure gauge and thereafter restore the dust cap, some reliable and practical means of giving such a conspicuous indication of under-inflation or over-inflation of the tire is of great practical importance in view of the great vogue of balloon tires, that is tires of low pressure and thin flexible walls. Such tires are very injuriously affected both by over-inflation and by under-inflation even to a comparatively small degree.

The present invention solves that problem by providing pressure-responsive means adapted to be permanently secured to the tire stem and maintained in communication with the compressed air in the tire, combined with display-signaling means of such a character that it will give visual warning by means of conspicuous display signals plainly noticeable at a glance, and without close inspection, by means of a pressure-responsive cap arranged to cover the inner end of the device, that is the end toward the center of the wheel, and to expose or conceal from view, by the edge of its open end, a display element so conspicuous as to be visible at a distance, thereby dispensing with the close inspection of each individual tire and involving no reading of a fine scale.

In the accompanying drawings I have illustrated a device constructed in accordance with this invention, in which:

Figure 1 is a vertical central section of the device and its attaching coupling for securing it to the tire.

Figure 2 is a side elevation of the device.

Figure 3 is a side view, partly in section and partly in elevation, showing the position of the indicator or signaling cap when the tire is under-inflated.

Figure 4 is a view, similar to Figure 3, showing the position of the cap and pressure-responsive means when the tire is over-inflated.

In the practice of the invention, as herein illustrated, I provide a hollow body forming a compressed air chamber 10, provided with suitable coupling means 11 for permanently but detachably securing it to the stem of the tire, and having an interior boss 12 positioned to engage the stem of the tire valve and unseat it to allow air from the tire to flow through communicating passage 13 into the interior of the body or air chamber.

To avoid removal of the device when it is desired to inflate the tire or to deflate it, a lateral nipple 14 is provided containing the usual air-sealing valve 15.

A diaphragm 16 of flexible material, impervious to air, is tightly clamped around its periphery against the inner end of the air chamber 10 or what may be termed the upper end, as shown in the drawings, by means of a covering cap 17 screwed tightly down against an interposed washer. The cover cap has an upward extension forming a plunger casing $17^a$ in which is slidably mounted a plunger sleeve 18, whose lower end is internally threaded to retain an adjustable tensioning nut 19, which nut is interiorly threaded to have engagement with the threaded downward extension $20^a$ of the plunger spindle 20. Preferably the pitch on the interior and exterior threads of the nut 19 is the same so that it may be adjusted back and forth to vary the tension of the helical compression spring 21, without disturbing the relative positions of the plunger spindle and the plunger sleeve. The upper end of the spindle passes through a bearing in the end wall $17^b$ of the casing so that by means of the light bearing engagement between the sleeve 18 and the interior of the casing $17^a$, and the light bearing engagement between the end wall $17^b$ of the casing and the adjacent portion of the spindle, the plunger has an interior supporting bearing engagement that prevents lateral displacement while permitting free and easy movement of the plunger. The upper end of the plunger carries an exterior indicator cap whose closed end wall 20$^b$ forms an intermediate connection between the peripheral wall 20$^c$ of the cap and the interiorly supported plunger so that the cap moves in unison with the plunger and diaphragm which form pressure-responsive means whose position is determined by the rise and fall of air pressure thrusting against the yielding spring 21.

The exterior wall 22 of the casing, while closely corresponding to the interior diameter of the indicator cap 20$^c$ is, nevertheless, proportioned to leave a very slight clearance space between these two parts so that there will be no frictional engagement between them that will be affected by any light accumulation of dust, thereby avoiding impairing the sensitiveness of the device.

As it is of the essence of this invention that the signal to the motorist should be of such a nature as to be conspicuously visible at a moderate distance from the car, so that at a glance he can tell whether the tires exposed to his view are over or under-inflated, I provide on the exterior wall 22 of the casing a circumferential display signaling band 22$^a$ of such visible contrast with the adjacent surfaces as to be plainly noticeable at a distance and of a width to allow enough leeway below the appropriate maximum pressure of the tire to insure its concealment by the cap only when the tire pressure has fallen to the point that will be injurious to the tire. Hence the band in whole or in part will be displayed so long as the tire pressure does not fall below normal to the danger point and, in case of excessive air pressure, a portion of the contrasting wall 22 will be uncovered above the signal band and give plainly visible notice of that condition.

It will, therefore, be seen that so long as the colored or contrasting band 22$^a$ is visible the driver is assured that the normal standard of air pressure is being maintained in the tires. When the band is covered by the cap so that the band is no longer visible the driver is warned of dangerous under-inflation. The exposure of the contrasting surface of the exterior casing wall between the display band and the lower edge of the cap signals over-inflation of the tire which is just as important when using balloon tires, practically speaking, as is under-inflation.

What I claim is:

1. A visual safety signal device for pneumatic tires embracing in combination, a compressed air chamber adapted to be permanently attached to a tire stem to maintain communication with the interior of the tire, an imperforate air-sealing diaphragm of flexible impervious material secured in said chamber to yieldingly sustain the air pressure of the tire, a spring-pressed plunger arranged to oppose a yielding counterbalancing thrust against the air-pressed diaphragm so as to move to and fro within an inclosing casing, the exterior wall of said casing being provided with a conspicuously displayed circumferential band at a distance below its upper end, and a cap secured to the projecting end of said plunger and overlapping the circumferential wall, said cap being proportioned to have its lower edge substantially register with the upper portion of said display band when the air pressure of the tire is normal, and to expose, above said display band, a contrasting portion of the exterior wall when the air pressure rises above normal and to conceal said display band when the air pressure falls below a safe normal pressure.

2. A visual safety signal for pneumatic tires, embracing an air chamber adapted to be permanently secured to a tire stem to continuously admit air from the tire, an imperforate air-sealing diaphragm of flexible impervious material, a plunger casing, a slidable plunger therein spring-pressed to oppose a counter-balancing resistance to the air pressure against the diaphragm, the casing being provided with a circumferential display band of conspicuously contrasting appearance to render it visible at a distance, an external cap secured to the plunger to move therewith and so coordinated with the plunger and the display band as to expose the display band to view at normal pressure while concealing it from view when the tire pressure falls materially below normal.

3. A visual safety signal for pneumatic tires embracing in combination, a compressed air chamber, adapted to be permanently secured to a tire stem to afford continuous communication with the interior of the tire, a spring-pressed movable plunger responsive to variations in the air pressure of the tire, and having centralizing bearing engagement with interior portions of the casing, a plunger casing provided with an exterior wall having an exterior display band conspicuously contrasting with the adjacent portion of the wall surface, a cap whose upper end is closed carried by the plunger in overlapping relation to said exterior wall, the cap, plunger and display band being correlated to expose the display band at normal pressure and to cover the band when the tire pressure falls substantially below normally safe pressure.

4. A visual safety signal for pneumatic tires embracing in combination, a compressed air body adapted to be permanently attached to a tire stem to have continuous communication with the interior of the tire, air-sealing pressure responsive means opposing a yielding counter-balancing resistance to the air pressure, an inclosing casing therefor provided with an exterior wall having a conspicuously contrasting display band of width and appearance to be easily visible at a distance, an external band-concealing cap whose end is closed, a centralizing bearing rod supporting and guiding the cap and connected with the pressure-responsive means to be moved thereby, the lower edge of the cap being disposed to cover from view said display band when the tire pressure is below normal and to uncover it to view when the tire pressure is at normal standard.

5. In a visual safety signal for pneumatic tires embracing in its construction a hollow body adapted to be permanently attached to the valve stem of a tire having a valved intake for the admission of compressed air, the combination of a piston casing secured to the open outer end of said body and having two concentric walls forming separate chambers, a flexible air-sealing diaphragm secured between the body member and the piston casing, a hollow plunger slidably mounted in the inner chamber, a compression spring inserted inside said plunger to exert a yielding thrust of said plunger against the diaphragm in opposition to the compressed air on the other side of the diaphragm, a central post forming part of said plunger and carrying at its outer end a cylindrical cap arranged to overlap the outer wall of said casing and positioned at normal pressure of the tire to expose below its edge a conspicuously visible signal band which is concealed from view when the tire pressure falls below normal, and a sleeve of flexible material connected with said post and with the outside of the inner wall of the casing to prevent the entrance of dust, substantially as described.

In witness whereof, I have subscribed the above specification.

JOHN E. KENNEDY.